Nov. 25, 1941.  D. E. CHAMBERS  2,264,068
CONTROL SYSTEM
Original Filed Dec. 14, 1937
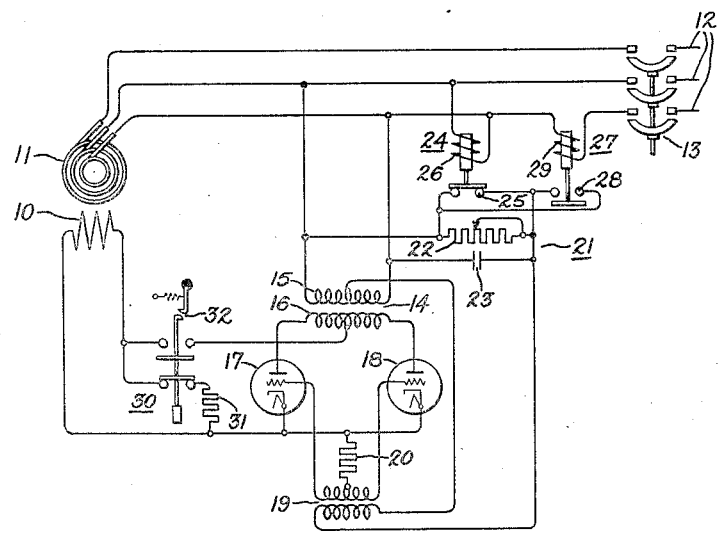
Inventor:
Dudley E. Chambers,
by Harry E. Dunham
His Attorney.

Patented Nov. 25, 1941

2,264,068

UNITED STATES PATENT OFFICE 2,264,068

CONTROL SYSTEM

Dudley E. Chambers, Scotia, N. Y., assignor to General Electric Company, a corporation of New York Original application December 14, 1937, Serial No. 179,701. Divided and this application August 28, 1940, Serial No. 354,534

5 Claims. (Cl. 172—274)

My invention relates to control systems and more particularly to electron tube control systems for electric circuits or dynamo-electric machines.

This application is a division of my copending application Serial No. 179,701, filed December 14, 1937, patented April 15, 1941, No. 2,238,623, and assigned to the assignee of the present application.

A number of electron tube control systems have been devised heretofore for regulating both electric circuits and dynamo-electric machines in accordance with various operating conditions, but most of the systems have been adapted for a precision and refinement of control which has necessitated comparatively complicated apparatus. There are certain applications of electronic control apparatus where great precision or range of control is not required. One such application is to synchronous motors. Synchronous motors for industrial applications, unless utilized for power factor control, are ordinarily operated without automatic means for controlling the field excitation and are arranged to have a field excitation sufficiently high to operate satisfactorily without breaking from synchronism for a predetermined drop in supply voltage or sustained or momentary overloads below a predetermined value. This practice requires a constantly applied reserve field excitation which does not give the most economical or efficient arrangement. Electronic devices such as rectifiers have been proposed heretofore as sources of excitation for synchronous motors but when uncontrolled, changes in the supply voltage produce corresponding changes in the field excitation so that a drop in line voltage produces a decrease in field excitation which is an undesirable condition. Arrangements have been proposed to effect proper control of the rectifier in accordance with voltage, current and power factor, but these arrangements have not presented the simplicity of control and economy conducive to general commercial application.

It is an object of my invention to provide an improved system of control for a synchronous motor receiving its field excitation from the supply circuit of the motor which shall maintain said motor in synchronous operation under the usual conditions of voltage variations and overloads encountered in practice without operating continuously with an excess reserve excitation.

It is another object of my invention to provide an improved electronic control and system of control for synchronous motors whereby a smaller motor may be used for a given industrial application than would be required in accordance with the practice of providing continuous reserve excitation, or whereby the load imposed on a given size of motor may be increased to an amount, or the supply voltage decreased to an amount, which would otherwise be prohibitive for satisfactory operation.

In accordance with the illustrated embodiment of my invention, I provide excitation for the field winding of a synchronous motor through an electronic rectifier provided with a control electrode. The energization of the control electrode is arranged to provide normal field excitation for normal operating conditions. Voltage and current responsive means are arranged to change abruptly the energization of the control electrode so as to provide normal or above normal excitation when the supply voltage decreases below a predetermined value, or the current to the motor exceeds a predetermined value.

In carrying my invention into effect, in the above arrangement briefly described, I establish a substantially constant voltage ratio between the voltage of the supply circuit and the voltage applied to the field circuit so long as the voltage or current of the motor is within a predetermined range of values by controlling the degree of conductivity of the rectifier. That is, so long as the motor is operating within the predetermined range of values of current or voltage, the field circuit voltage is lower relative to the supply circuit voltage than when the supply circuit voltage or motor current departs from the predetermined range of values. In the latter event, the field circuit voltage is made higher than with the prior circuit adjustments for a given supply circuit voltage so that the ratio of supply circuit voltage to field circuit voltage is decreased.

My invention will be better understood from the following description taken in connection with the accompanying drawing, and its scope will be pointed out in the appended claims.

The single figure of the drawing is a diagrammatic representation of an embodiment of my invention as applied to a synchronous motor utilizing a rectifier with a control electrode.

Referring to the drawing, I have illustrated an arrangement for controlling the excitation of the field winding 10 of an alternating current dynamo-electric machine, diagrammatically represented as a three-phase synchronous motor 11, connected to be energized from a three-phase alternating current circuit 12. A switch 13 is shown in the circuit 12 as representative of a suitable means for controlling the application of voltage to the motor. The field winding 10 is connected to be energized from the supply circuit 12 through any suitable conventional rectifier which may be of the single phase or polyphase type, but which, for purposes of simplicity in illustration, I have shown as a bi-phase rectifier of the single-phase type comprising a transformer 14 having a primary winding 15 and a secondary winding 16 having a pair of electric valves 17 and 18 connected to the outer terminals thereof with the field winding 10 included in the direct current circuit of the rectifier. The electric valves 17 and 18 are each represented as being provided with an anode and a cathode and a control electrode. Single-cathode, multiple-anode valves are equally suitable, and although any of the various types of single-anode or multiple-anode valves may be used, I prefer to use valves of the vapor or gaseous type such as valves of the mercury vapor type. Furthermore, although the control electrode has been shown in the form of a grid, this is merely illustrative since valves of the immersion ignitor type may be used without departing from my invention in its broader aspects. The control electrodes of the valves are connected to the common cathode circuit through opposite halves of the secondary winding of a grid transformer 19 and a current limiting resistor 20. The primary winding of the grid transformer 19 is connected to be energized from the transformer winding 15 of the rectifier. In accordance with the illustrated embodiment of my invention, the grid control circuit is arranged to provide a grid excitation so as to render the valves partially conductive in any forward cycle of anode voltage to provide suitable excitation for the field winding 10 under normal conditions of operation and means operative in accordance with the operation of an under-voltage relay or over-current relay to render the valves fully conductive for under-voltage conditions of applied voltage or over-current conditions of the motor. As a means for effecting such control, I have shown the primary winding of grid transformer 19 connected to be energized from an impedance phase shifting circuit 21 comprising an adjustable resistance 22 and a capacitor 23 connected in series relation across the supply circuit to the primary winding 15. The primary winding of grid transformer 19 is connected to the electrical mid-point of transformer winding 15 and to the junction between resistance 22 and capacitor 23.

In order selectively to control the output of the rectifier and hence the excitation of field winding 10, I provide an under-voltage relay 24 having contacts 25 and an operating winding 26 which is connected to be responsive to the voltage of the supply circuit 12. I also provide an over-current relay 27 which is provided with contacts 28 and an operating winding 29 connected to be energized in accordance with the motor current. The contacts 25 of the under-voltage relay 24 and the contacts 28 of the over-current relay are connected across the resistor of the phase shifting circuit. For normal operation, the resistance 22 is adjusted to provide such a phase relation between the potential of the control electrodes and the anode voltage as to render the valves 17 and 18 conductive for such fractional periods of each cycle of anode voltage as will provide normal excitation for the motor for normal operating conditions. When either or both of the contacts 25 and 28 are closed, the potential of the control electrodes is changed so as to render the valves fully conductive or conductive for a different increased fractional period of each cycle.

Any convenient automatic starting means may be utilized for starting the motor and, by way of illustration of such means, I have shown a manually operated switch 30 which in the illustrated position short circuits the field winding 10 through a discharge resistor 31 and in the upper position disconnects the discharge resistor and connects the field winding 10 to be energized from the rectifier. The switch 30 is maintained in the upper position for normal running operation by the locking mechanism 32.

The cycle of operation for the illustrated embodiment of my invention is substantially as follows: It will be assumed that the switch 13 in the supply line has been closed, that switch 30 has been moved to its upper position and that the motor is in normal synchronous operation with normal voltage applied. Under these conditions, the contacts 25 of relay 24 will be open whereas the relay 27 will be in its drop-out position and its contacts will also be open. With the relays 24 and 27 in the assumed positions the resistor 22 of the phase shifting circuit is adjusted to retard the phase of the grid voltage so that suitable excitation is provided for field winding 10 under normal conditions of operation. Under this condition, the valves are not fully conductive in each forward cycle of applied anode voltage. A decrease in line voltage below a predetermined value, for example below 70 per cent of normal for a unity power factor motor, will cause relay 24 to close its contacts 25 and thereby short circuit resistance 22 of the phase shifting circuit. This causes the grid excitation voltage to shift abruptly in phase with the anode voltage and thereby causes the valves to be fully conductive throughout each forward cycle of applied anode voltage. This abruptly changes the field excitation to a maximum value corresponding to the then existing line voltage and full conductive condition of the valves, or some other predetermined conductive condition. A similar effect is obtained for an over-current condition when relay 27 picks up and short circuits the resistor 22. In this case the excitation is increased and thereby the pull-out torque of the motor increased irrespective of whether the supply voltage has departed from normal.

It will be observed that by virtue of my above described control system I provide an arrangement whereby the excitation supplied to the control members of the electric valve means is maintained at a constant value for a predetermined electrical condition or electrical characteristic of the associated motor for a predetermined range thereof, and in which the excitation supplied to the control members is abruptly changed to a second constant value for a range of the electrical condition which is contiguous to the first-mentioned range.

While I have shown and described a particular embodiment of my invention, it will be obvious to those skilled in the art that various changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. In combination, a synchronous motor provided with armature and field windings, an alternating current circuit connected to said armature winding, rectifying means including electric valve means for energizing said field winding from said alternating current circuit, said electric valve means being provided with anode, cathode and control members, an excitation circuit for each control member for supplying thereto a constant excitation to maintain one predetermined relationship between the current transmitted to the field winding by said rectifying means and an electrical characteristic of said motor for all values of said electrical characteristic lying within a predetermined range, and means for abruptly changing the excitation of said control members to a different constant value to maintain a second relationship between the motor field current and said electrical characteristic for all values of said characteristic lying within a range contiguous to the first mentioned range.

2. In combination, a synchronous motor provided with armature and field windings, an alternating current circuit connected to said armature winding, rectifying means including electric valve means for energizing said field winding from said alternating current circuit, said electric valve means being provided with anode, cathode and control members, an excitation circuit for each control member and for supplying thereto a constant excitation and for controlling said rectifying means to transmit to said field winding a predetermined value of current established by an electrical characteristic of said motor lying within a predetermined range and including an impedance phase shifting circuit for controlling the phase relation between the potentials of said control member and said anode members, said impedance phase shifting circuit including a pair of impedance arms normally adjusted to provide a constant phase retardation between the potentials of said control electrode and said anode members for all values of said electrical characteristic of said alternating current circuit as will permit synchronous operation of said motor at said phase retardation, and means responsive to said electrical characteristic for changing the impedance of one of said impedance arms to provide a different constant excitation by virtue of a smaller phase retardation between the potentials of said control members and said anodes for all values of said electrical characteristic lying within a second predetermined range contiguous to the first mentioned range.

3. In combination, a synchronous motor provided with armature and field windings, an alternating current circuit connected to said armature winding, rectifying means including electric valve means for energizing said field winding from said alternating current circuit, said electric valve means being provided with anode, cathode and control electrode members, an excitation circuit for each control electrode including an impedance phase shifting circuit for controlling the phase relation between the potentials of said control electrode and said anode members, said impedance phase shifting circuit including a pair of impedance arms normally adjusted to provide a constant phase retardation between potentials of said control electrode and said anode members for all values of voltage of said alternating current circuit lying within a predetermined range, and a relay operative at all other values responsive to said voltage and for changing the impedance of said impedance phase shifting circuit and for impressing on said control electrodes in-phase potentials relative to the respective anode members for all values of voltage lying within a second predetermined range of voltage which is contiguous to the first predetermined range.

4. In combination, a synchronous motor provided with armature and field windings, an alternating current circuit connected to said armature winding, rectifying means including electric valve means for energizing said field winding from said alternating current circuit, said electric valve means being provided with anode, cathode and control electrode members, an excitation circuit for each control electrode member including an impedance phase shifting circuit for controlling the phase relation between the potentials of said control electrode and said anode members, said impedance phase shifting circuit including an adjustable resistance arm and a capacitance arm adjusted to render said electric valve means conductive for a constant fractional portion of each half cycle of anode voltage as will permit synchronous operation of said motor for all values of applied voltage within a predetermined range, and an undervoltage relay connected to be energized from said alternating current circuit for short circuiting said resistance arm for all values of voltage of said alternating current circuit below the first mentioned range and lying within a range contiguous thereto.

5. In combination, a synchronous motor provided with armature and field windings, an alternating current circuit connected to said armature winding, rectifying means including electric valve means for energizing said field winding from said alternating current circuit, said electric valve means being provided with anode, cathode and control electrode members, an excitation circuit for each control electrode member including an impedance phase shifting circuit for controlling the phase relation between the potentials of said control electrode and said anode members, said impedance phase shifting circuit including a pair of impedance arms normally adjusted to render said electric valve means conductive for a constant fractional portion of each half cycle of anode voltage as to provide field excitation to give said motor a predetermined pull-out torque for all values of motor armature current lying within a predetermined range, and means responsive to the current supplied to said motor for short circuiting such impedance arm of said phase shifting circuit as will render said electric valve means fully conductive throughout each half cycle of anode voltage for all values of motor armature current above said predetermined range and lying within a range contiguous thereto.

DUDLEY E. CHAMBERS.